(12) United States Patent
Donderici

(10) Patent No.: US 12,122,422 B2
(45) Date of Patent: Oct. 22, 2024

(54) SECONDARY AUTONOMOUS VEHICLE INTERCEPTOR IN DIFFICULT MAP AREAS TO PROVIDE ADDITIONAL SENSOR DATA

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 388 days.

(21) Appl. No.: 17/672,282

(22) Filed: Feb. 15, 2022

(65) Prior Publication Data
US 2023/0256993 A1    Aug. 17, 2023

(51) Int. Cl.
*B60W 60/00*    (2020.01)
*B60W 40/02*    (2006.01)
*H04W 4/46*    (2018.01)

(52) U.S. Cl.
CPC ........ *B60W 60/0011* (2020.02); *B60W 40/02* (2013.01); *B60W 60/0015* (2020.02); *H04W 4/46* (2018.02); *B60W 2420/403* (2013.01); *B60W 2420/408* (2024.01); *B60W 2556/50* (2020.02); *B60W 2556/65* (2020.02)

(58) Field of Classification Search
CPC ............. B60W 60/0011; B60W 40/02; B60W 60/0015; B60W 2420/403; B60W 2420/408; B60W 2556/50; B60W 2556/65; B60W 60/001; H04W 4/46; H04W 4/38

USPC .......................................................... 701/23
See application file for complete search history.

(56) References Cited

U.S. PATENT DOCUMENTS

| | | | |
|---|---|---|---|
| 11,430,071 B2 * | 8/2022 | Shalev-Shwartz | ........................ G01C 21/3407 |
| 2020/0209867 A1 * | 7/2020 | Valois | .................... G01S 7/4808 |
| 2021/0026348 A1 * | 1/2021 | Gogna | ................. G05D 1/0038 |
| 2022/0171382 A1 * | 6/2022 | Austria | ................ G05D 1/0022 |
| 2022/0185266 A1 * | 6/2022 | Shah | .................. G01C 21/3407 |
| 2022/0185267 A1 * | 6/2022 | Beller | ............... B60W 30/0956 |
| 2023/0243994 A1 * | 8/2023 | Donderici | ............. G01S 13/931 701/23 |
| 2023/0391371 A1 * | 12/2023 | Donderici | ......... B60W 60/0016 |

FOREIGN PATENT DOCUMENTS

| | | | | |
|---|---|---|---|---|
| CA | 3170561 A1 * | 9/2021 | ............. | B60Q 9/008 |
| WO | WO-2021021680 A1 * | 2/2021 | ........... | G05D 1/0027 |

* cited by examiner

*Primary Examiner* — Muhammad Shafi
(74) *Attorney, Agent, or Firm* — Michael DiCato

(57) ABSTRACT

Aspects of the disclosed technology provide solutions for improving object detection and in particular, for improving object detection by an autonomous vehicle (AV) perceptions stack. In some aspects, a process of the disclosed technology can include steps for receiving first sensor data corresponding with an environment around the first vehicle, wherein the first sensor data represents one or more objects in the environment, receiving second sensor data corresponding with the environment around the first vehicle, and formulating a navigation route, by the first vehicle, based on the one or more occluded objects in the environment. Systems and machine-readable media are also provided.

17 Claims, 5 Drawing Sheets

SECONDARY AUTONOMOUS VEHICLE INTERCEPTOR IN DIFFICULT MAP AREAS TO PROVIDE ADDITIONAL SENSOR DATA

BACKGROUND

1. Technical Field

The present technology includes systems, apparatuses, methods, computer readable medium, and circuits for assisting a first autonomous vehicle (AV) to navigate a difficult area comprising an occlusion by providing sensor data relating to the occlusion to the first autonomous vehicle that is captured by a second autonomous vehicle positioned at a different location than the first autonomous vehicle.

2. Introduction

Autonomous vehicles are vehicles having computers and control systems that perform driving and navigation tasks that are conventionally performed by a human driver. As autonomous vehicle technologies continue to advance, ride-sharing services will increasingly utilize autonomous vehicles to improve service efficiency and safety. However, autonomous vehicles will be required to perform many of the functions that are conventionally performed by human drivers, such as avoiding dangerous or difficult routes, and performing other navigation and routing tasks necessary to provide safe and efficient transportation. Such tasks may require the collection and processing of large quantities of data disposed on the autonomous vehicle.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 1:
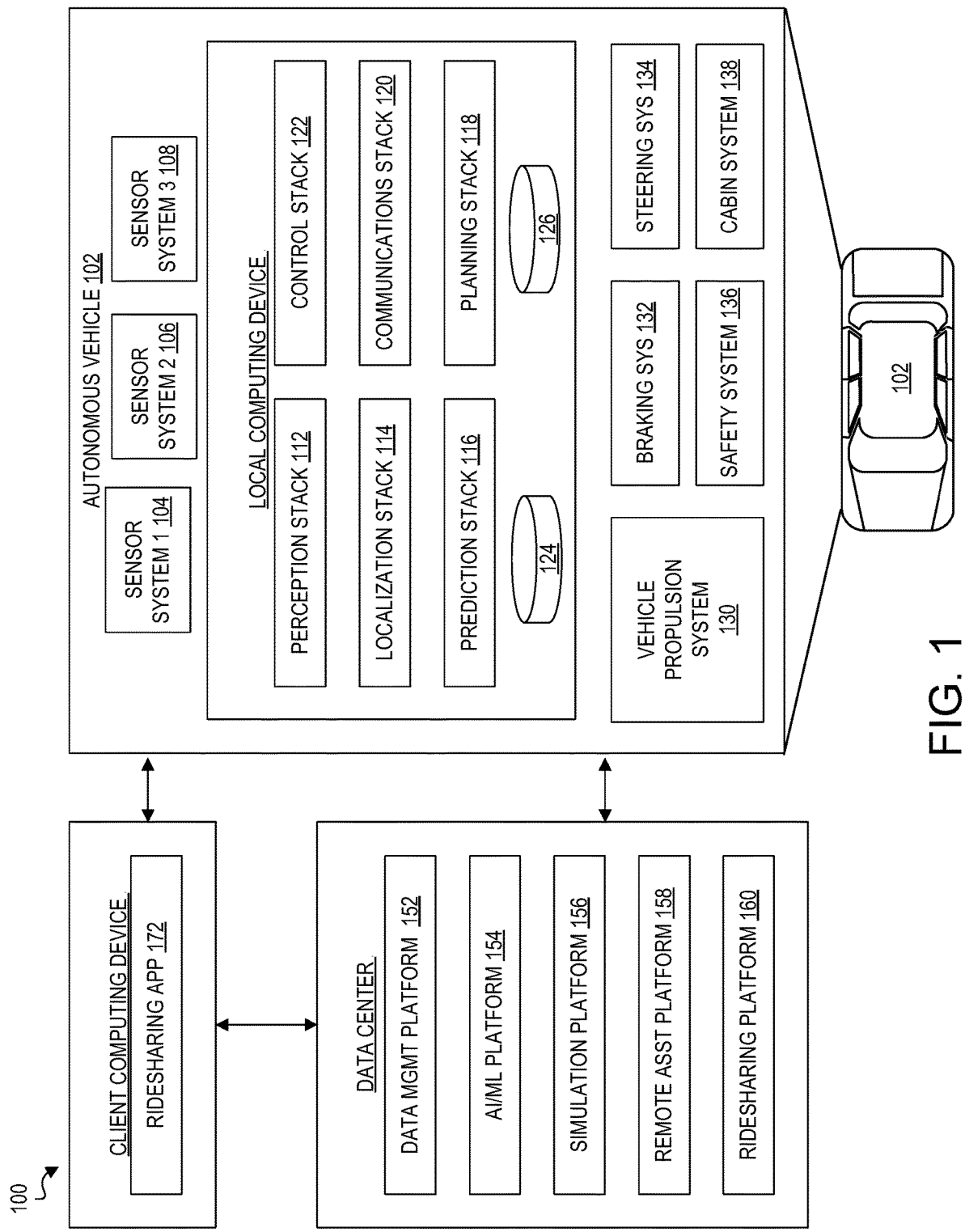
FIG. 1 illustrates an example of a system for managing one or more Autonomous Vehicles (AVs) in accordance with some aspects of the present technology.

FIG. 1 illustrates an example of an autonomous vehicle (AV) management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and a high definition (HD) geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). The bounding area may by defined on grid that consists of a rectangular, cylindrical or spherical projection of the camera or LIDAR data. The environmental uncertainties may be represented as an occupancy grid where the grid is composed of cells that can be rectangular, cylindrical, spherical or any other shape. Each cell may be associated with an occupancy state such as occupied, free, unknown. Alternatively, each cell may be associated with a probability of occupancy.

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point. In some embodiments, the prediction stack 116 can output a probability distribution of likely paths or positions that the object is predicted to take. In some embodiments, the prediction stack 116 can spawn ghost objects in occluded areas of the map or in areas where there is substantial uncertainty of occupancy or where occupancy is unknown.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
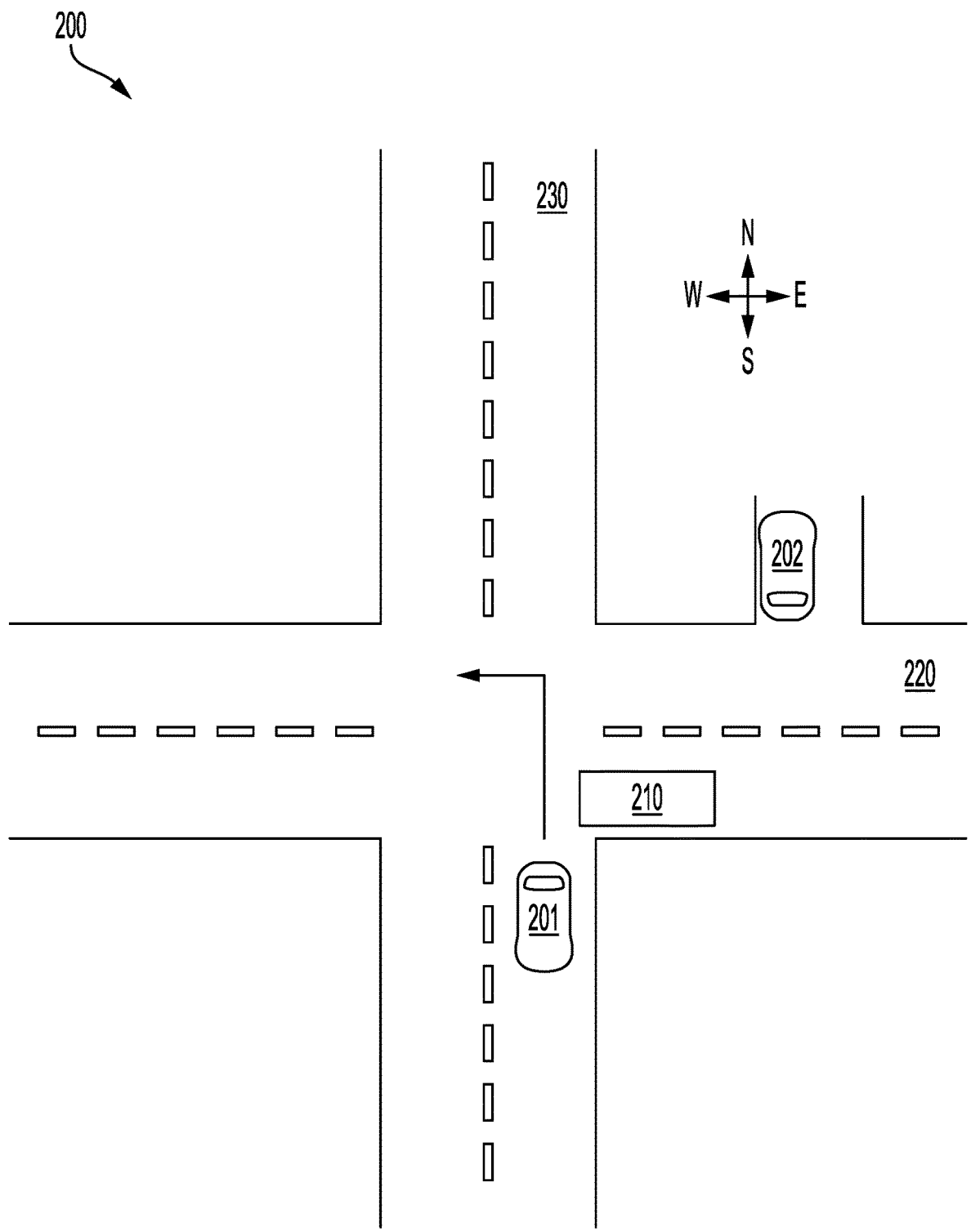
FIG. 2 illustrates an example environment in which an object detection process of the disclosed technology may be implemented.

FIG. 2 illustrates an example environment in which an object detection process of the disclosed technology may be implemented. Systems, methods, and computer-readable media are disclosed for assisting a first autonomous vehicle to navigate a difficult area comprising an occlusion by providing sensor data relating to the occlusion to the first autonomous vehicle that is captured by a second autonomous vehicle positioned at a different location than the first autonomous vehicle. As discussed above, AVs can navigate roadways without a human driver based on sensor signals generated by multiple sensor systems. The AV processes the data received from the sensors in order to take appropriate actions to navigate the AV to the destination and avoid collisions along the way. One problem encountered when attempting to navigate an AV in a difficult area is various occlusions may block the path of the sensors. Occlusions are especially problematic in situations such as left-hand turns and narrow curving streets. The sensors positioned on the AV may lack the necessary field of view and the use of additional sensors positioned at a different location may be helpful. Occlusions may be full occlusions that prevent any sensory information to pass such as walls, large vehicles such as trucks or busses. Occlusions may be partial occlusions that pass some sensory information but not enough to process one of the key characteristics of the occluded object such as position, size, orientation, speed, angular speed.

For example, when an AV intends to make a left-hand turn, the system must account for low visibility, heavy traffic, as well as the speed and direction of approaching cars. Additional occlusions, such as cars parked on the opposite side of the road, may also contribute to the difficulty of safely determining when to proceed. Therefore, it is beneficial to position a second AV comprising sensors at a location with a better field of view to assist the first AV and provide sensor data to the first AV from the point of view of the second AV. The first AV may be referred to as the "ego" AV, and the second AV may be referred to as the "support" AV. For example, FIG. 2 illustrates ego AV 201, support AV 202, and occlusion 210. In the example illustrated in FIG. 2, ego AV approached an intersection and wishes to turn left as shown by the arrow. However, in this example, occlusion 210 is blocking the sensors positioned on ego AV 201 from detecting traffic or other objects that may be approaching from the east along street 220. In this scenario, ego AV 201 can receive sensor data from support 202 which is positioned at a location wherein the sensors positioned on support AV 202 are not blocked by occlusion 210 and may therefore determine when it is safe for ego AV 201 to proceed with a left turn. That is, the support AV 202 can assist the ego AV 201 in navigating troublesome areas by sharing its sensor data and permitting the ego AV to proceed with additional data.

The support AV may provide support to the ego AV on a dynamic basis. Specifically, when a user of the ego AV makes a service request for the ego AV to travel to a location, the ego AV may determine that the route that the ego AV will take includes difficult areas with known occlusions. In such a case, the ego AV may automatically request a support AV to be located at the difficult area at the time that the ego AV anticipates it will approach the difficult area in order to provide the additional sensor data. In such a case, a stationary support AC may be dispatched to the location, or alternatively another AV already in the area may be re-routed.

The sensor data shared by the support AV to the ego AV may be raw sensor data, or alternatively, it may be processed data. Raw data is much larger and may require more time to communicate but provides the ego AV with more complete information. Alternatively, data processed at the support AV first and then communicated to the ego AV is smaller and faster to communicate, but risks omitting helpful data. Various concerns may be contemplated when determining what type of data is optimal for communicating between the support AV and the ego AV.

Further, the ego AV and the support AV can work together to provide each other with a more complete picture of the surrounding environment. For example, in the case of a large occlusion, the ego AV may be in position to only partially sense the object, while the support AV may be position to only partially sense a different part of the object. The ego AV and the support AV may communicate their captured sensor data (raw or processed) with each other and combine the data to create a more complete picture of the sensed object. Additionally, the specific needs of the ego AV may be communicated to the support AV so that the support AV may more efficiently sense and provide the necessary data to the ego AV. For example, the ego AV may not need all the camera and lidar sensor data that the support AV is capable of capturing, and instruct the support AV to turn off certain cameras or sensors in order to streamline the data and conserve resources.

Figure 3:
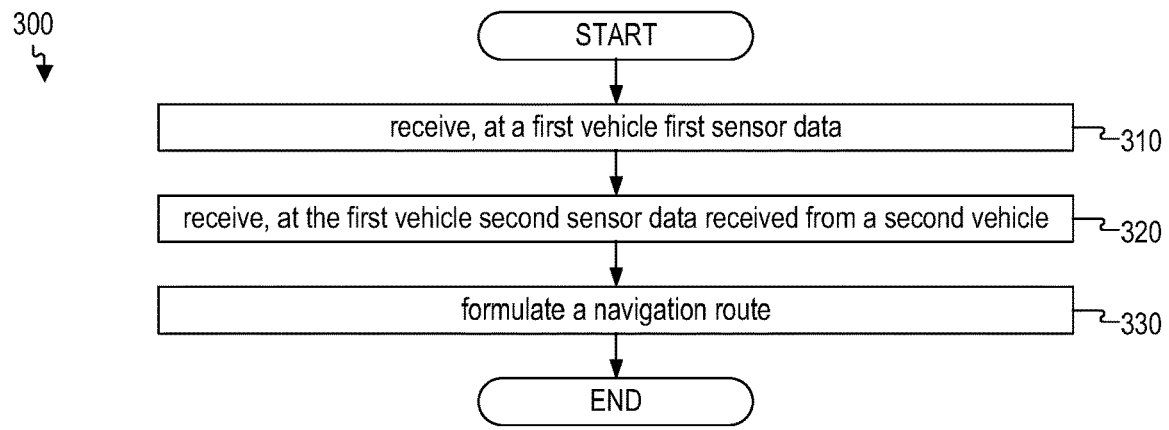
FIG. 3 is a flowchart of a method for assisting a first autonomous vehicle to navigate a difficult area comprising an occlusion by providing sensor data relating to the occlusion to the first autonomous vehicle that is captured by a second autonomous vehicle positioned at a different location than the first autonomous vehicle according to an example of the instant disclosure.

FIG. 3 illustrates an example method 300 for assisting a first autonomous vehicle to navigate a difficult area comprising an occlusion by providing sensor data relating to the occlusion to the first autonomous vehicle that is captured by a second autonomous vehicle positioned at a different location than the first autonomous vehicle. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some embodiments, the method includes receiving, at a first vehicle, first sensor data corresponding with an environment around the first vehicle 201 at block 310. For example, the perception stack 112 illustrated in FIG. 1 may receive, at a first vehicle 201, first sensor data corresponding with an environment around the first vehicle. In some embodiments, the first sensor data represents one or more objects in the environment.

According to some embodiments, the method includes receiving, at the first vehicle 201, second sensor data corresponding with the environment around the first vehicle at block 320. For example, the perception stack 112 illustrated in FIG. 1 may receive, at the first vehicle, second sensor data corresponding with the environment around the first vehicle. In some embodiments, the second sensor data is received from a second vehicle 202. In some embodiments, the second sensor data represents one or more occluded objects in the environment that are not detectable by the first vehicle.

According to some embodiments, the method includes formulating a navigation route, by the first vehicle, based on the one or more occluded objects in the environment at block 330. For example, the planning stack 118 illustrated in FIG. 1 may formulate a navigation route, by the first vehicle, based on the one or more occluded objects in the environment.

Figure 4:
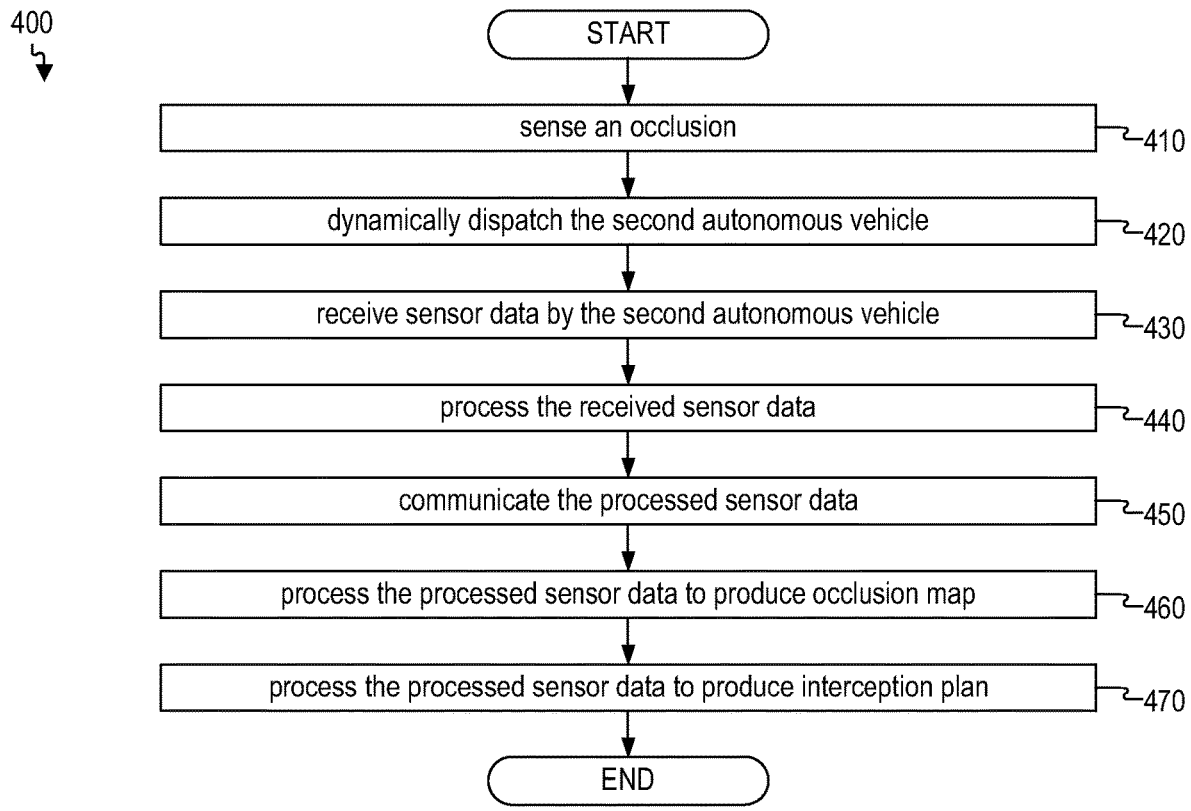
FIG. 4 illustrates steps of an example process for dispatching a support vehicle, e.g., to facilitate object detection, according to some aspects of the disclosed technology.

FIG. 4 illustrates an example method 400 for assisting a first autonomous vehicle to navigate a difficult area comprising an occlusion by dispatching a second autonomous vehicle to a location not obscured by the occlusion to thereby provide sensor data relating to the occlusion to the first autonomous vehicle that is captured by a second autonomous vehicle positioned at a different location than the first autonomous vehicle. Although the example method 100 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 100 may perform functions at substantially the same time or in a specific sequence.

According to some embodiments, the method includes sensing an occlusion by the first autonomous vehicle at block 410. For example, the sensor system 104 illustrated in FIG. 1 may sense an occlusion by the first autonomous vehicle. The method further includes dynamically dispatching a second autonomous vehicle to a location not obscured by the occlusion at block 420. For example, the Data Center illustrated in FIG. 1 may dynamically dispatch the second autonomous vehicle to a location not obscured by the occlusion. In sensing the occlusion, the first autonomous vehicle may use the occupancy map.

In determining whether to act on an occlusion or not, the severity of the occlusion has to be taken into account. The determination of the severity of occlusion is made by processing the state of the cells of the occlusion map. Specifically, the occlusion map can be processed along with the map information to find a probability of having an object at each cell of the occlusion map. Historical statistical data can be used to relate the map state to probability of having different classes of objects. For example, historical data of having pedestrians on a particular walkway at a given time can be used to determine the probability of having pedestrians in the cells that are associated with the walkway when the first autonomous vehicle approaches it. Finally, the total severity is calculated by adding up all of the severities from different cells of the occupancy map. Alternatively, the severity of the occlusion can be determined by spawning ghost objects in the uncertain locations of the occupancy map and predicting or simulating the outcome from a safety and comfort point of view. Finally the severity of the occlusion is compared to a threshold to make the determination of dispatching the second autonomous vehicle or not. The threshold can be set to a value that operationally optimizes safety, comfort and the cost of sustaining the second autonomous vehicle.

The time of dispatch for the second autonomous vehicle can be optimized to minimize operational costs while maximizing the safety and comfort for the first autonomous vehicle. For example, the dispatch can be delayed if the cost of having the second autonomous vehicle at the interception location is higher than the cost of having the second autonomous vehicle at its original location before dispatch. The time of dispatch as well as the planning and routing for the second vehicle can be done in a way that maximizes the success of interception. This can be achieved as part of usual planning by running a simulation and determining the actions that would maximize the time at the interception location and visibility of the occluded area by the second autonomous vehicle. Similarly, the routing and planning of the first autonomous vehicle can also be adjusted to maximize the joint visibility of the occluded area by the first and the second autonomous vehicles. For example, if the second autonomous vehicle is arriving at the interception too late, the first autonomous vehicle can go slower within acceptable operational parameters.

In some embodiments, determination of the occlusion can be made statistically without first autonomous vehicle sensing the area with the occlusion. For example, first autonomous vehicle can sense environmental parameters (locations of objects, weather, lighting, state of construction, traffic lights, presence or absence of traffic congestion, traffic density on roads) and a prediction of occlusion is made based on the sensed environmental parameters. This can be made using a Machine Learning model training on historical data that connects occlusions to environmental parameters. In this case, the dispatch of the second autonomous vehicle is made based on a comparison between a threshold and probability or score of having an occlusion. Threshold can be set to a value that optimizes safety, comfort and operational costs.

Either the first autonomous vehicle or the second autonomous vehicle may utilize parking to introduce delays to their planning to facilitate successful operation of the interception plan. Similarly, first or second autonomous vehicles can be actively carrying passengers, they can be inactive. Second autonomous vehicle can be operated in a way that optimizes the traffic in a way that is favorable for the first autonomous vehicle within acceptable operational parameters. A probability success for the interception can be made by first and second autonomous vehicles. If the probability of success falls below a threshold or to zero, execution of interception may be terminated by either autonomous vehicle.

According to some embodiments, the method includes receiving sensor data by the second autonomous vehicle relating to an occlusion at block 430. For example, the sensor system 104 illustrated in FIG. 1 may receive sensor data by the second autonomous vehicle relating to an occlusion. The method further includes processing the received sensor data to produce processed sensor data at block 440. For example, the perception stack 112 illustrated in FIG. 1 may process the received sensor data to produce processed sensor data. In alternative embodiments, the second autonomous vehicle may communicate raw data to the first autonomous vehicle. However, raw data is typically larger and may require more time to communicate, but provides the first autonomous vehicle with more complete information. Alternatively, data processed at the second autonomous vehicle first and then communicated to the first autonomous vehicle is smaller and faster to communicate, but risks omitting potentially useful data. Various concerns may be contemplated when determining what type of data is optimal for communicating between the first autonomous vehicle and the second autonomous vehicle.

According to some embodiments, the method includes communicating the processed sensor data to the first autonomous vehicle at block 450. For example, the ridesharing platform 160 illustrated in FIG. 1 may communicate the processed sensor data to the first autonomous vehicle. The method further includes processing the processed sensor data using a perception stack to produce an occlusion map at block 460. For example, the perception stack 112 illustrated in FIG. 1 may process the processed sensor data using a perception stack to produce an occlusion map. According to some embodiments, the method includes processing the processed sensor data to produce an interception plan for the first autonomous vehicle at block 470. For example, the planning stack 118 illustrated in FIG. 1 may process the processed sensor data to produce an interception plan for the first autonomous vehicle. In some embodiments, the first autonomous vehicle executes the interception plan and drives based on the plan.

Figure 5:
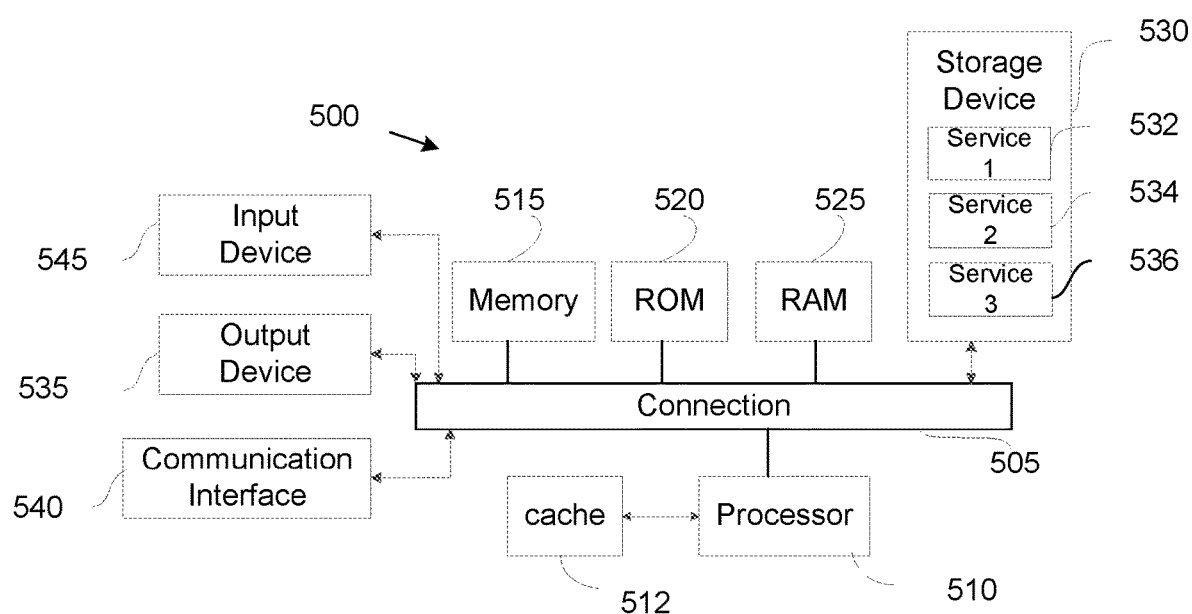
FIG. 5 shows an example of a system for implementing certain aspects of the present technology.

FIG. 5 shows an example of computing system 500, which can be for example any computing device making up the various components of an autonomous vehicle, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. An apparatus for detecting objects in an environment, comprising:
   at least one memory; and
   at least one processor coupled to the at least one memory, the at least one processor configured to:
   receive, at a first vehicle, first sensor data corresponding with an environment around the first vehicle, wherein the first sensor data represents one or more objects in the environment;
   receive, at the first vehicle, second sensor data corresponding with the environment around the first vehicle, wherein the second sensor data is received from a second vehicle, wherein the second vehicle is dispatched to assist the first vehicle based on a location of the first vehicle, and wherein the second sensor data represents one or more occluded objects in the environment that are not detectable by the first vehicle; and
   formulate a navigation route, by the first vehicle, based on the one or more occluded objects in the environment.

2. The apparatus of claim 1, wherein the second sensor data comprises Light Detection and Ranging (LiDAR) data, radar data, camera data, or a combination thereof.

3. The apparatus of claim 1, wherein the second sensor data comprises object tracking data for the one or more occluded objects in the environment.

4. The apparatus of claim 1, wherein the one or more occluded objects are not within a field-of-view of one or more sensors of the first vehicle.

5. The apparatus of claim 1, wherein the first vehicle is an autonomous vehicle (AV).

6. The apparatus of claim 1, wherein the second vehicle is an autonomous vehicle (AV).

7. A computer-implemented method for detecting objects in an environment, the method comprising:
   receiving, at a first vehicle, first sensor data corresponding with an environment around the first vehicle, wherein the first sensor data represents one or more objects in the environment;
   receiving, at the first vehicle, second sensor data corresponding with the environment around the first vehicle, wherein the second sensor data is received from a second vehicle, wherein the second vehicle is dispatched to assist the first vehicle based on a location of the first vehicle, and wherein the second sensor data represents one or more occluded objects in the environment that are not detectable by the first vehicle; and
   formulating a navigation route, by the first vehicle, based on the one or more occluded objects in the environment.

8. The computer-implemented method of claim 7, wherein the second sensor data comprises Light Detection and Ranging (LiDAR) data, radar data, camera data, or a combination thereof.

9. The computer-implemented method of claim 7, wherein the second sensor data comprises object tracking data for the one or more occluded objects in the environment.

10. The computer-implemented method of claim 7, wherein the one or more occluded objects are not within a field-of-view of one or more sensors of the first vehicle.

11. The computer-implemented method of claim 7, wherein the first vehicle is an autonomous vehicle (AV).

12. The computer-implemented method of claim 7, wherein the second vehicle is an autonomous vehicle (AV).

13. A non-transitory computer-readable storage medium comprising at least one instruction for causing a computer or processor to:
   receive, at a first vehicle, first sensor data corresponding with an environment around the first vehicle, wherein the first sensor data represents one or more objects in the environment;
   receive, at the first vehicle, second sensor data corresponding with the environment around the first vehicle, wherein the second sensor data is received from a second vehicle, wherein the second vehicle is dispatched to assist the first vehicle based on a location of the first vehicle, and wherein the second sensor data represents one or more occluded objects in the environment that are not detectable by the first vehicle; and
   formulate a navigation route, by the first vehicle, based on the one or more occluded objects in the environment.

14. The non-transitory computer-readable storage medium of claim 13, wherein the second sensor data comprises Light Detection and Ranging (LiDAR) data, radar data, camera data, or a combination thereof.

15. The non-transitory computer-readable storage medium of claim 13, wherein the second sensor data comprises object tracking data for the one or more occluded objects in the environment.

16. The non-transitory computer-readable storage medium of claim 13, wherein the one or more occluded objects are not within a field-of-view of one or more sensors of the first vehicle.

17. The non-transitory computer-readable storage medium of claim 13, wherein the first vehicle is an autonomous vehicle (AV).

* * * * *